(12) United States Patent
Jenicek et al.

(10) Patent No.: US 11,788,657 B2
(45) Date of Patent: Oct. 17, 2023

(54) LIQUID LINE WITH A PLASTIC CORRUGATED HOSE

(71) Applicant: Continental Automotive GmbH, Hannover (DE)

(72) Inventors: Zdenek Jenicek, Brandys (CZ); Petr Vanicky, Brandys n.L. (CZ)

(73) Assignee: Continental Automotive GmbH, Hannover (DE)

( * ) Notice: Subject to any disclaimer, the term of this patent is extended or adjusted under 35 U.S.C. 154(b) by 11 days.

(21) Appl. No.: 17/224,323

(22) Filed: Apr. 7, 2021

(65) Prior Publication Data

US 2021/0310593 A1    Oct. 7, 2021

(30) Foreign Application Priority Data

Apr. 7, 2020  (DE) .................. 10 2020 204 492.9

(51) Int. Cl.
*F16L 33/34*    (2006.01)
*F16L 13/02*    (2006.01)

(52) U.S. Cl.
CPC .......... *F16L 33/34* (2013.01); *F16L 13/0209* (2013.01)

(58) Field of Classification Search
CPC ........ F16L 33/34; F16L 13/0209; F16L 11/11; F16L 47/02
USPC ........................................... 285/331
See application file for complete search history.

(56) References Cited

U.S. PATENT DOCUMENTS

| | | | |
|---|---|---|---|
| 4,089,351 A | 5/1978 | Ward et al. | |
| 4,437,691 A * | 3/1984 | Laney | F16L 25/0036 285/55 |
| 2004/0232694 A1 | 11/2004 | Martin | |
| 2005/0062282 A1 | 3/2005 | Rosch et al. | |
| 2006/0208485 A1 | 9/2006 | Discher et al. | |
| 2007/0075543 A1* | 4/2007 | Marx | B29C 66/12441 285/903 |
| 2009/0308479 A1 | 12/2009 | Krauss et al. | |
| 2020/0269517 A1* | 8/2020 | Kullik | F16L 33/34 |

FOREIGN PATENT DOCUMENTS

| | | |
|---|---|---|
| CN | 110316155 A | 10/2019 |
| CN | 110594516 A | 12/2019 |
| CN | 209743832 U | 12/2019 |

(Continued)

OTHER PUBLICATIONS

Search Report dated Nov. 30, 2020 from corresponding German Patent Application No. DE 10 2020 204 492.0.

(Continued)

*Primary Examiner* — James M Hewitt, II

(57) ABSTRACT

A liquid line improved in terms of effective producibility with a high level of process reliability and quality assurance comprising at least one corrugated hose and at least one connection piece for connecting the liquid line to a further component, wherein the corrugated hose and the connection piece are produced from plastic and are connected to one another via at least one welded connection, wherein the welded connection is produced by means of a laser welding process, wherein the welded connection is tight at least up to a defined operating pressure in the liquid line and wherein a stop is formed in the connection piece and defines an axial end position of the corrugated hose in the connection piece.

12 Claims, 2 Drawing Sheets

(56) References Cited

FOREIGN PATENT DOCUMENTS

| DE | 2608662 A1 | 9/1976 |
| DE | 10322972 A1 | 12/2004 |
| DE | 10336494 A1 | 3/2005 |
| DE | 102005010664 A1 | 9/2006 |
| DE | 202006005545 U1 | 8/2007 |
| DE | 102008017922 B4 | 5/2017 |
| EP | 0939266 A2 | 9/1999 |

OTHER PUBLICATIONS

Search Report dated Jun. 24, 2022 from corresponding Chinese patent application No. 202110346818.9.
First Office Action dated Jun. 30, 2022 from corresponding Chinese patent application No. 202110346818.9.
First Office Action (Translated) dated Jun. 30, 2022 from corresponding Chinese patent application No. 202110346818.9.

* cited by examiner

LIQUID LINE WITH A PLASTIC CORRUGATED HOSE

BRIEF DESCRIPTION OF THE DRAWINGS

Individual details and advantages of the invention will be explained in more detail below on the basis of an exemplary embodiment. In the figures.

DETAILED DESCRIPTION

The disclosure relates to a liquid line with a corrugated hose composed of plastic.

Liquid lines with a corrugated hose composed of plastic are known and widely available. For example, liquid lines of said type are used for guidance of washing liquid in motor vehicle cleaning systems. During production, the corrugated hose is cut to length according to the required dimension and is provided at the end sides with corresponding connection pieces in order to quickly connect the liquid line to further components and assemblies, such as for example nozzles, pumps, containers, etc. Such a connection has to be hydraulically tight to such an extent that it permanently withstands the operating pressure within the liquid line, which is normally up to 5 bar.

The wall of a corrugated hose is, in cross section, formed as an alternating sequence of outer bulges and inner bulges. By way of such a construction, the corrugated hose is flexible and pressure-resistant, and moreover offers high resistance against buckling. On the other hand, reliable sealing when connecting to other components presents a challenge for the same reason.

For example, DE 103 22 972 A1 disclosed an established solution for producing a tension-resistant and pressure-tight connection. According to said document, the corrugated hose, in the connection piece, is sealed off by way of an O-ring and is fixed by way of a separate securing ring. However, improvements are considered necessary with respect to the use of a large number of components, associated increased logistics, assembly and quality control outlay and high production cycle times and material costs.

CN 110594516 A disclosed a line composed of a plastic corrugated hose and plastic plug-in connectors, in the case of which line the corrugated hose is connected to the plug-in connector via a welded connection produced using a laser welding process. The plug-in connector is manufactured from a laser-transparent plastic and has for this purpose a tubular portion. The corrugated hose is introduced into the tubular portion and is welded to the latter all round from radially at the outside by way of a laser beam.

However, the proposed solution requires particular measures at the tool in order for the corrugated hose and the plug-in connector to be brought into the desired position in relation to one another and to be held firmly during the welding, which causes relatively high production outlay and a long cycle time. In particular for lines with a small diameter, process reliability and continuity of results appear to be in need of improvement.

Against this background, the disclosure is based on the object of proposing an improved liquid line, which makes possible in particular effective producibility with a high level of process reliability and quality assurance.

Said object is achieved by a liquid line having the combination of features, refinements and further exemplary embodiments of the disclosure.

Figure 1:
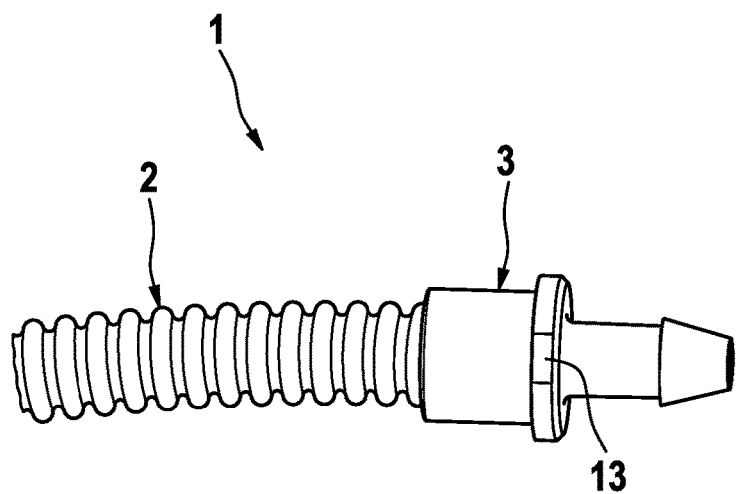
FIG. 1 shows a partial view of an exemplary liquid line.

FIG. 1 shows, by way of example, a portion of a liquid line 1 according to the disclosure using the example of a cleaning-agent line for a cleaning apparatus of a motor vehicle.

A connection piece 3 is fastened in a hydraulically sealed manner to a corrugated hose 2 at one side and serves for quick attachment of the liquid line 1 to a unit, assembly or a further component.

The connection piece 3 is laser-welded directly to the corrugated hose 2, as will be explained in more detail with reference to the subsequent FIG. 2. For this purpose, the connection piece 3 must be produced from a laser-transparent plastic. It is perfectly possible to provide both components from the same laser-transparent base material, wherein a suitable coloring agent (such as for example soot) is admixed to the base material for the corrugated hose 2 so as to reduce or to prevent the transparency thereof.

Figure 2:
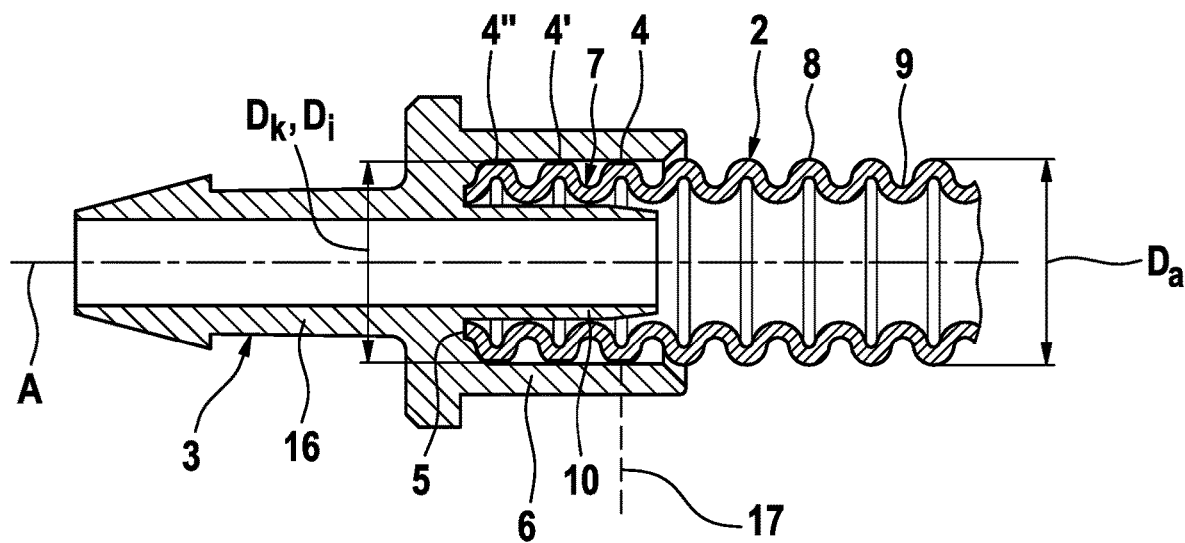
FIG. 2 shows an exemplary embodiment of the liquid line in an axial section through the connection piece.

FIG. 2 shows one end of the liquid line 1 as per FIG. 1 in an axial section.

In the exemplary embodiment shown, the connection piece 3 is designed with a connector 16 and substantially rotationally symmetrically with respect to a central axis A. Further embodiments, for example with a receiving cavity instead of a connector, of angled instead of straight elongate form, etc., remain likewise permissible within the scope of the disclosure, however.

At the corrugated-hose side, the connection piece 3 has a pipe portion 6 into which the corrugated hose 2 engages with a separately prepared end portion 7.

The pipe portion 6 has a defined inner diameter Di. The corrugated hose 2 is, in cross section, constructed as an alternating sequence of outer bulges 8 and inner bulges 9 that flow one into the other and has an outer diameter Da>Di.

The end portion 7 of the corrugated hose 2 is therefore calibrated according to a defined calibration diameter Dk<Da. For a reliable, pressure-tight connection, the end portion 7 should preferably comprise at least 3 corrugations of the corrugated hose 2. Here, the calibration diameter Dk is selected in such a way that the end portion 7 is received in the pipe portion 6 with a press fit. Such a calibration can, particularly effectively and quickly, be realized thermally with an apparatus which is suitable for this purpose. Here, the radially outer peaks of the outer bulges 8 are plastically deformed and flattened at a defined temperature. Beside a reduction in diameter, this results, advantageously, in an increase of the contact surface between the corrugated hose 2 and the pipe portion 6.

Consequently, the subsequent welded connections 4, 4', 4" can be made more reliably and so as to be wider. The calibration together with the applied press fit moreover lead to the corrugated hose 2 bearing against the inner wall of the pipe portion 6 securely, and without any air gaps, over the entire circumference in the regions of the future welded connections 4, 4', 4". This makes it possible for requirements for precision during orientation and focusing of the laser beam 17 to be reduced, whereby the welding tool can be of a simpler and less expensive design.

In order, for the welding process, for the corrugated hose 2 to be positioned with respect to the connection piece 3 at a defined axial position automatically and without additional outlay on measurement and orientation with high-precision reproducibility, a stop 5 is formed in the connection piece.

The corrugated hose 2 thus merely has to be plugged into the pipe portion 6 until it bears against the stop 5 and, in this way, automatically reaches its desired axial end position. Assembly errors and outlay on monitoring are consequently reduced significantly. With the production, it is thus possible for the corrugated hose 2 to be used by the meter, provided at one end with the connection piece 3 and only afterwards dimensioned and cut at the other end. The resulting length tolerances can thus be halved in comparison with a method in which the corrugated hose is firstly cut to a defined length and is only afterwards provided at both ends with connection pieces.

In order to further improve the precision during the positioning of the corrugated hose 2, the stop is, in cross section, formed with a profile which, over its entire extent, is formed in a manner substantially complementary to the corresponding end of the corrugated hose 2. In this way, the axial contact surface between the corrugated hose 2 and the connection piece 3 extends over the entire radial extent of the corrugated hose wall. The adverse effects of angle tolerances and other cutting errors during the cutting to length of the corrugated hose 2 according to the precision of its axial positioning in the connection piece 3 are consequently significantly lessened to completely eliminated. For further details in relation to the stop 5, reference is made in particular to FIG. 4.

In order to eliminate a possible influence of cutting errors during the cutting to length of the corrugated hose 2 on the welded connection 4" nearest to the end and additionally to simplify the introduction of the end portion 7 into the pipe portion 6, the corrugated hose 2 is to end or be cut or cut to length preferably within the profile of an inner bulge 9. Particularly preferably, the cut or the end of the corrugated hose should pass through the radially inner low point of the inner bulge 9, as illustrated in FIG. 2.

In order to further simplify the fitting of the corrugated hose 2 in the connection piece 3, to stabilize the position of the end portion 7 and to avoid possible buckling or twisting of the corrugated hose in the connection piece, the connection piece is equipped with a guide element 10. In the preferred exemplary embodiment shown, the guide element is in the form of a tubular projection which is coaxial with the pipe portion 6 and which engages axially into the corrugated hose 2 or end portion 7 at one side. Consequently, between the guide element 10 and the pipe portion 6 in a radial direction, there is formed a receiving space 11 in which the end portion 7 of the corrugated hose 2 can be received in a secure and protected manner.

After the introduction of the end portion 7 into the pipe portion 6 up to the stop 5, welded connections 4, 4', 4" are produced simultaneously or in succession in the region of the contact surfaces between the calibrated outer bulges 8 of the end portion 7 and the inner wall of the pipe portion 6 using radial or rotationally optical laser technology.

Figure 3:
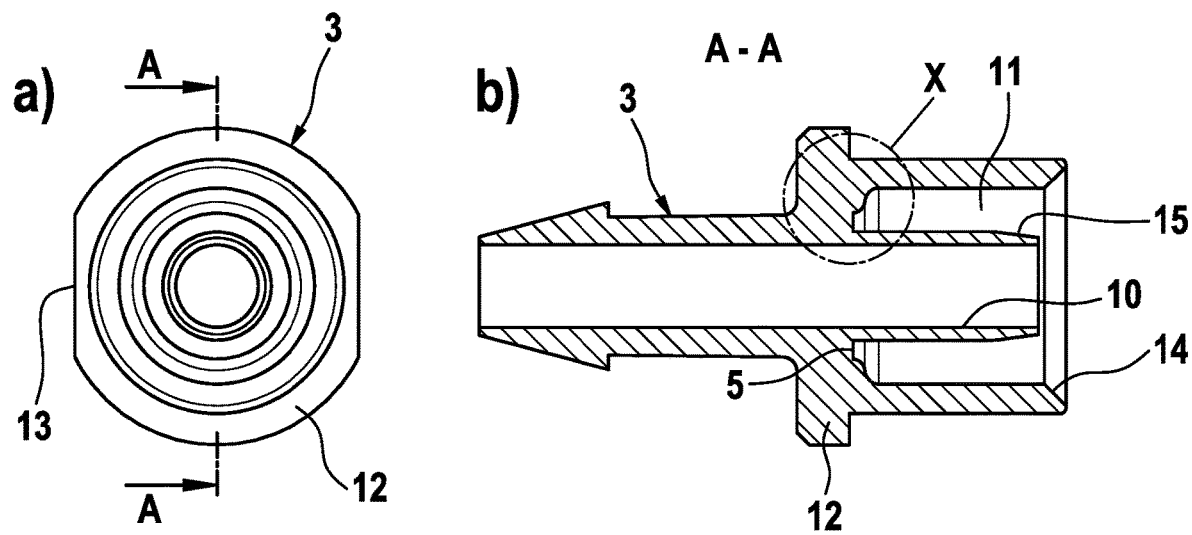
FIG. 3 shows an exemplary connection piece in plan view and in an axial section.

FIG. 3 serves in particular for illustrating the design of a preferred embodiment of the connection piece 3. It is particularly worth mentioning here that the pipe portion 6 is provided at its corrugated hose-side end with an inner bevel 14 and the guide element 10 has a tapering portion 15 at one side. These construction elements serve as kinds of introduction ramps during fitting or plugging of the corrugated hose 2 into the connection piece 3 and facilitate the process additionally. Equivalent solutions, such as for example curvatures or roundings of different type, remain likewise permissible within the scope of the disclosure.

The connection piece 3 furthermore has a circumferential flange 12. The flange 12 has radially oppositely flattened flanks 13. Said flanks improve handling when gripping, manipulating and connecting the connection piece 3 during assembly of the liquid line 1 at its place of use and can also be used effectively for marking the product.

Figure 4:
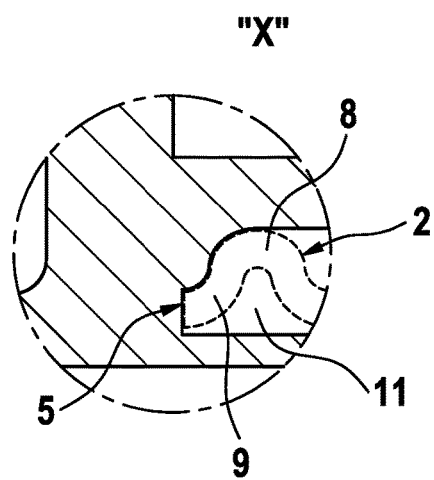
FIG. 4 shows an enlarged view of an exemplary stop profile.

FIG. 4 shows a preferred embodiment of the stop 5 in an enlarged detail. From the figure, it can be seen in particular that, in cross section, the profile of the stop 5, from radially at the outside, follows the profile of the outer and inner bulges 8,9 radially inward such that the corrugated hose 2 can, axially, be supported over the entire surface and not, for example, only at the cut edge against the stop 5.

The invention claimed is:

1. A liquid line for a cleaning apparatus in a vehicle, comprising:
    at least one corrugated hose and at least one connection piece configured to connect the liquid line to a further component,
        wherein the corrugated hose and the connection piece comprise plastic and are connected to one another via at least one welded connection;
        wherein the welded connection is produced by means of a laser welding process;
        wherein the welded connection is tight at least up to a defined operating pressure in the liquid line;
        wherein a stop is formed in the connection piece and defines an axial end position of the corrugated hose in the connection piece,
        wherein the stop has a profile which, in terms of its entire radial extent, is formed to be substantially entirely complementary to a corresponding end of the corrugated hose such that an axial contact surface between the corrugated hose and the connection piece extends over the entire radial extent of the corrugated hose wall at the corresponding end of the corrugated hose; and
        wherein the connection piece comprises a pipe portion which radially engages around outside of an end portion of the corrugated hose and a guide element which engages axially into the end portion of the corrugated hose, the guide element and the pipe portion forming a receiving space therebetween, the end portion of the corrugated hose being received into the receiving space and welded at its outside diameter to inside of the pipe portion.

2. The liquid line as claimed in claim 1, wherein the corrugated hose has an outer diameter, wherein the end portion is calibrated according to a defined calibration diameter being smaller than the outer diameter.

3. The liquid line as claimed in claim 2, wherein the calibration is realized thermally.

4. The liquid line as claimed in claim 2, wherein the calibration diameter is selected in such a way that the end portion is received in the pipe portion with a press fit.

5. The liquid line as claimed in claim 2, wherein the corrugated hose, in cross section, has alternating outer bulges and inner bulges and radially outer peaks of the outer bulges are plastically deformed and flattened by the calibration.

6. The liquid line as claimed in claim 2, wherein the calibration results in increase of the contact surface between the corrugated hose and the pipe portion.

7. The liquid line as claimed in claim 6, wherein the increase of the contact area enables the subsequent welded connections to be wider than without calibration.

8. The liquid line as claimed in claim 4, wherein the calibration together with the applied press fit lead to the corrugated hose bearing against the inner wall of the pipe portion securely and without any air gaps, over the entire circumference in the regions of welded connection.

9. The liquid line as claimed in claim 1, wherein the end portion comprises at least 3 corrugations of the corrugated hose.

10. The liquid line as claimed in claim 1, wherein the corrugated hose, in cross section, has alternating outer bulges and inner bulges and, at the stop side, ends within the profile of an inner bulge.

11. The liquid line as claimed in claim 10 wherein the corrugated hose ends at a radially inner low point of the inner bulge.

12. The liquid line as claimed in claim 1, wherein the guide element, at the corrugated-hose side, is formed to be at least one of tapering, radially inwardly inclined, and curved, at least at an end side.

\* \* \* \* \*